United States Patent
Tashiro et al.

(10) Patent No.: US 6,709,256 B2
(45) Date of Patent: Mar. 23, 2004

(54) APPARATUS FOR ENCRUSTING A FILLING MATERIAL

(75) Inventors: Yasunori Tashiro, Utsunomiya (JP); Torahiko Hayashi, Utsunomiya (JP); Kazuyoshi Onoguchi, Utsunomiya (JP)

(73) Assignee: Rheon Automatic Machinery Co., Ltd., Tochigi-ken (JP)

(*) Notice: Subject to any disclaimer, the term of this patent is extended or adjusted under 35 U.S.C. 154(b) by 0 days.

(21) Appl. No.: 09/917,654

(22) Filed: Jul. 31, 2001

(65) Prior Publication Data

US 2002/0017204 A1 Feb. 14, 2002

(30) Foreign Application Priority Data

Aug. 1, 2000 (JP) ........................... 2000-233287

(51) Int. Cl.⁷ .............................. A21C 11/00
(52) U.S. Cl. .................. 425/142; 425/307; 425/313; 425/316; 426/503; 426/516; 426/518; 83/356.3; 99/537
(58) Field of Search ............... 425/142, 380, 425/307, 308, 313, 316; 426/503, 516, 518; 83/355, 356.3; 264/148, 159; 99/337

(56) References Cited

U.S. PATENT DOCUMENTS 5,031,567 A * 7/1991 Daouse et al. ............. 118/15
5,558,896 A * 9/1996 Kobayashi ................. 426/516
5,820,890 A 10/1998 Kobayashi ............... 425/133.1

FOREIGN PATENT DOCUMENTS

| EP | 0 247 825 | 12/1987 |
| EP | 0 359 393 | 3/1990 |
| EP | 0 601 194 | 6/1994 |
| EP | 0 676 149 | 10/1995 |
| EP | 08112056 | 5/1996 |

* cited by examiner

*Primary Examiner*—Robert Davis
*Assistant Examiner*—Joseph S Del Sole
(74) *Attorney, Agent, or Firm*—Finnegan, Henderson, Farabow, Garrett & Dunner, L.L.P

(57) ABSTRACT

An apparatus for encrusting bean jam is provided wherein patterns for opening and closing movements and up and down movements of shutter members of a cutting apparatus can be readily changed. The encrusting apparatus includes a cutting apparatus (13) having a plurality of shutter members (11) to cut a bar-like food material that is supplied from a combining nozzle (9), a food-receiving apparatus (17) to receive a food material that is encrusted and that is cut by the cutting apparatus (13), a first control motor M1 to open and close the plurality of the shutter members, and a second control motor M2 to move the food-receiving apparatus (17) up and down. The reference position for the first control motor M1 is determined on the position of the shaft of it when the shutter members (11) are closed to have their front ends meet at the center, or when the position is shifted 180 degrees in phase.

8 Claims, 4 Drawing Sheets

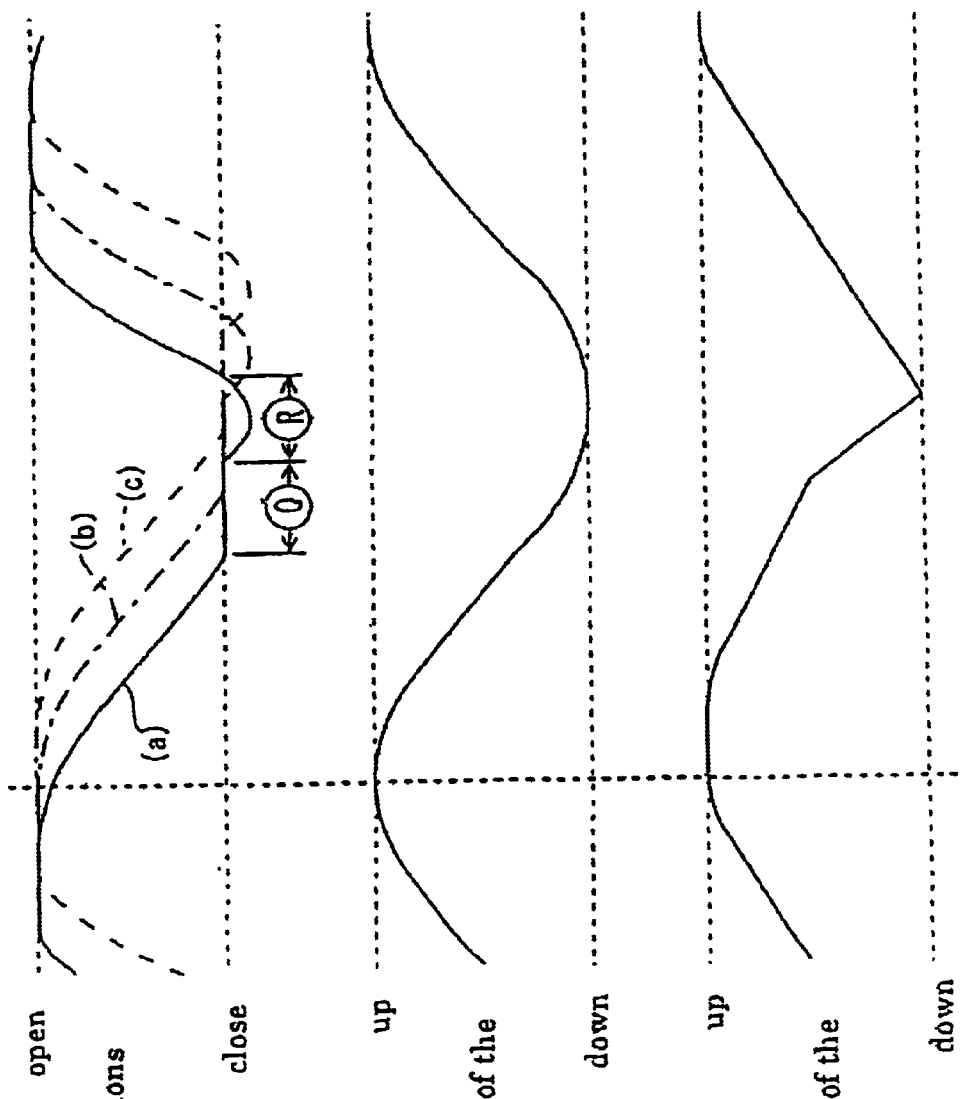

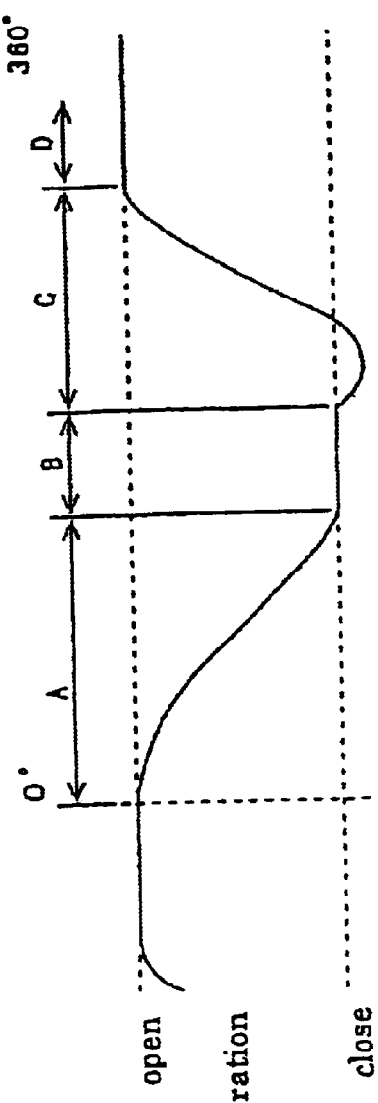
Fig. 4A  An opening and closing operation of the shutter members
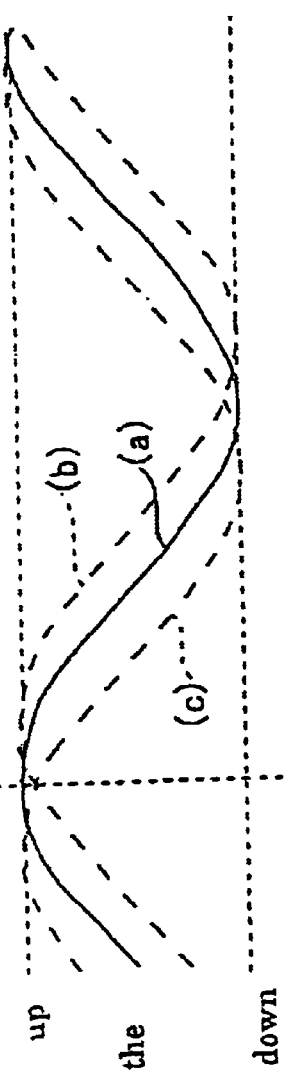
Fig. 4B  Up and down movements of the shutter members
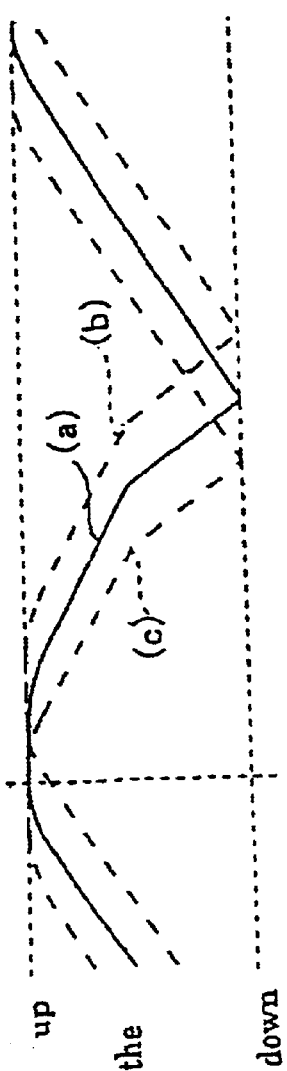
Fig. 4C  Up and down movements of the conveyer

APPARATUS FOR ENCRUSTING A FILLING MATERIAL

FIELD OF INVENTION

This invention relates to an apparatus for encrusting a filling material, such as bean jam. More particularly, it relates to an apparatus for encrusting a filling material, such as bean jam, in which the timing and speed of opening and closing a shutter apparatus comprising shutter members of a cutting apparatus can be conveniently controlled.

BACKGROUND OF INVENTION

A conventional apparatus relating to this invention is described in Japanese Patent No. 2641033. The apparatus disclosed in this patent includes a mechanism to open and close a shutter apparatus. It is comprised of shutter members of a cutting apparatus. The shutter members can be reciprocally rotated around pins that are located at regular intervals. The pins are connected to each other by linking members so that they interlock. One of the linking members is pivoted on a crank arm. It is connected to the shaft of a first control motor so that the crank arm reciprocates.

Also, a second control motor is used to rotate a cam mechanism. According to the movements of the cam mechanism, both the conveyor that receives an encrusted food product and the cutting apparatus are moved up and down.

In that conventional apparatus the opening and closing operations of the shutter apparatus carried out by the shutter members can be controlled independently of the up and down movements of the cutting apparatus. In that apparatus, so as to change the rates that the products are produced, for example, daily or hourly the rotations of the motors can be controlled to change the speeds of the up and down movements of the conveyor and the cutting apparatus. At that time, the timing of the opening and closing operations of the shutter members have to be controlled to meet the change of the speeds of the up and down movements of the conveyor and the cutting apparatus.

In that conventional apparatus the first control motor is used to open and close the shutter apparatus. However, it is not used to control the up and down movements of the conveyor and the cutting apparatus. They are controlled by the second control motor. Thus, in line with the timing of those movements of the conveyor and the cutting apparatus, the timing of the opening and closing operations must be controlled by changing the directions and the angles of the rotation of the shaft of the first control motor, and the timing of the starting and stopping of the reciprocal movements of the shutter members. These changes are complex and troublesome.

SUMMARY OF THE INVENTION

This invention was conceived to overcome the disadvantages discussed above. According to one concept of this invention, an apparatus is provided to encrust a filling material such as bean jam. It includes a cutting apparatus that includes a plurality of shutter members to cut a bar-like food material that is supplied by a combining nozzle. The shutter members can be swung or reciprocally rotated so that the shutter apparatus can be opened and closed. The cutting apparatus is moved up and down. The apparatus for encrusting a filling material also includes a food-receiving apparatus to receive a food material that is cut by the cutting apparatus into encrusted food products, a first control motor to open and close the plurality of the shutter members, and a second control motor to move the cutting apparatus and the food-receiving apparatus up and down. The reference position for the first control motor is set on a certain point on the shaft of it when the front ends of the shutter members are met at the center position of the shutter apparatus, or on a certain point on the same shaft that is shifted 180° in phase, or on a certain point on the shaft of it when the shutter members are opened, or on a certain point on the same shaft that is shifted 180° in phase.

The reference position for the second control motor is set on a certain point on the shaft of it when the food-receiving apparatus ascends to the highest point or descends to the lowest point.

The first and second control motors are rotated in one direction. A first cam mechanism is located between the first control motor and a shutter-opening and-closing mechanism, which opens and closes the shutter members of the cutting apparatus. The first cam mechanism is rotated in one direction so that the shutter members may be opened and closed by means of the shutter-opening and-closing mechanism. Also, a second cam mechanism is located between the second control motor and a mechanism to move the food-receiving apparatus up and down. The second cam mechanism is rotated in one direction so that the food-receiving apparatus may be moved up and down by the moving-up and-down mechanism.

A motor controller is located to control the speed of the rotation at a range of desired angles of the rotation during one revolution of each or both of the first and second control motors.

The first and second control motors can be synchronously rotated. Either or both of the first and second control motors can be conveniently controlled over the range of the angles of the rotation.

A memory device may be located in the motor controller to store patterns for controlling the first and second control motors.

BRIEF DESCRIPTIONS OF THE DRAWINGS

FIGS. 3A, 3B, and 3C show the relationships between patterns of the opening and closing movements of the shutter members and the up and down movements of the cutting apparatus.

FIGS. 4A, 4B, and 4C show the relationships between patterns of the opening and closing movements of the shutter members and the up and down movements of the cutting apparatus.

DESCRIPTIONS OF THE PREFERRED EMBODIMENTS

Figure 1:
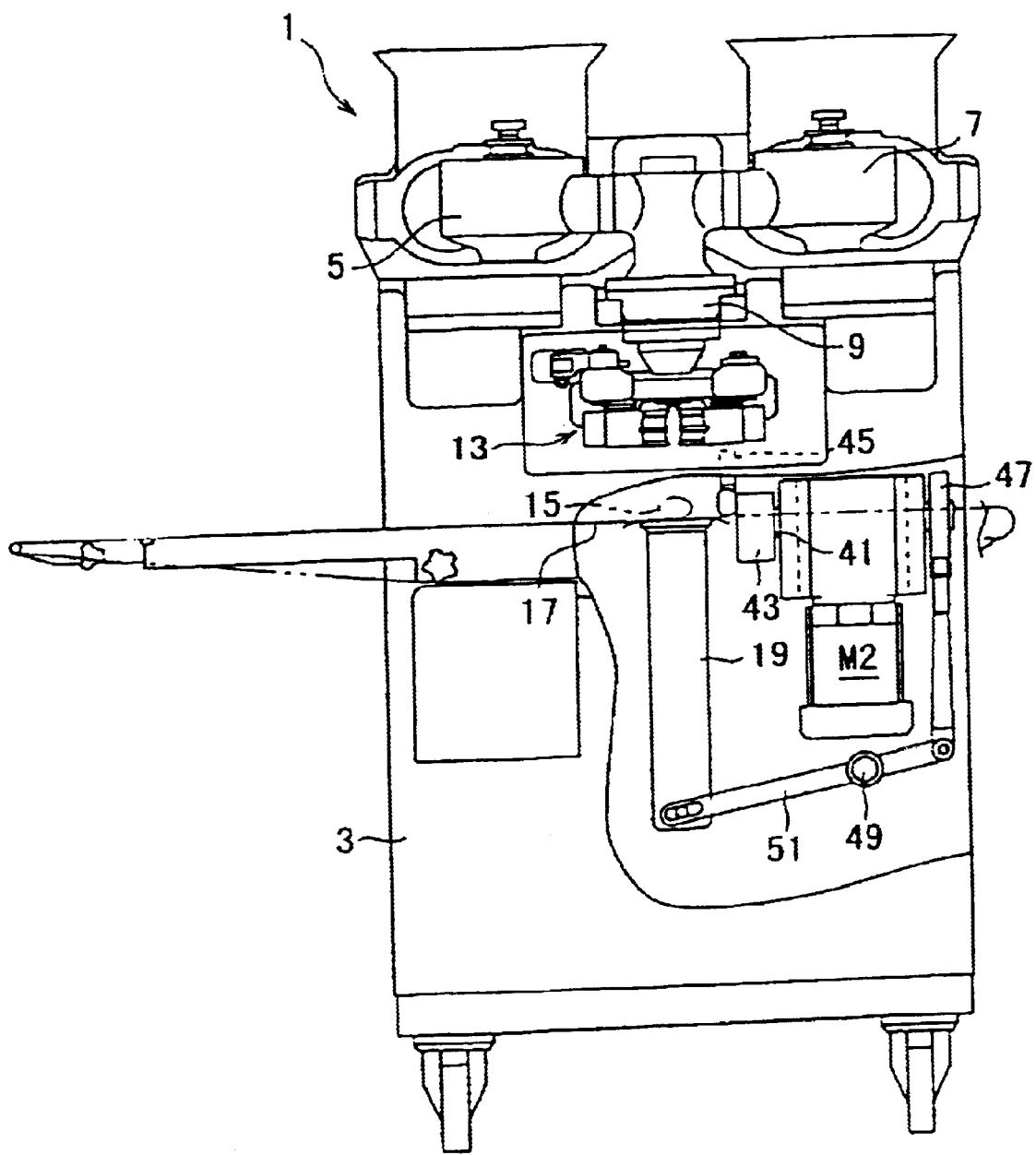
FIG. 1 shows a schematic front view of an apparatus for encrusting a filling material according to this invention.

FIG. 1 shows an embodiment of an apparatus 1 of this invention for encrusting a filling material. It has a frame 3. At the upper part of the apparatus a filling-supplying section 5 for supplying a filling material such as a bean jam is located. Also, at that part an encrustation-supplying section 7 for supplying an encrusting material such as bread is located. Also, at that part a combining nozzle 9 is located to encrust a filling material that is supplied by the filling-supplying section 5 with an encrustation that is supplied by the encrustation-supplying section 7, so that a bar-like food material is formed and supplied downward.

Known apparatuses may be used for the filling-supplying section 5, the encrustation-supplying section 7, and the combining nozzle 9. Thus, they will not be described.

Figure 2:
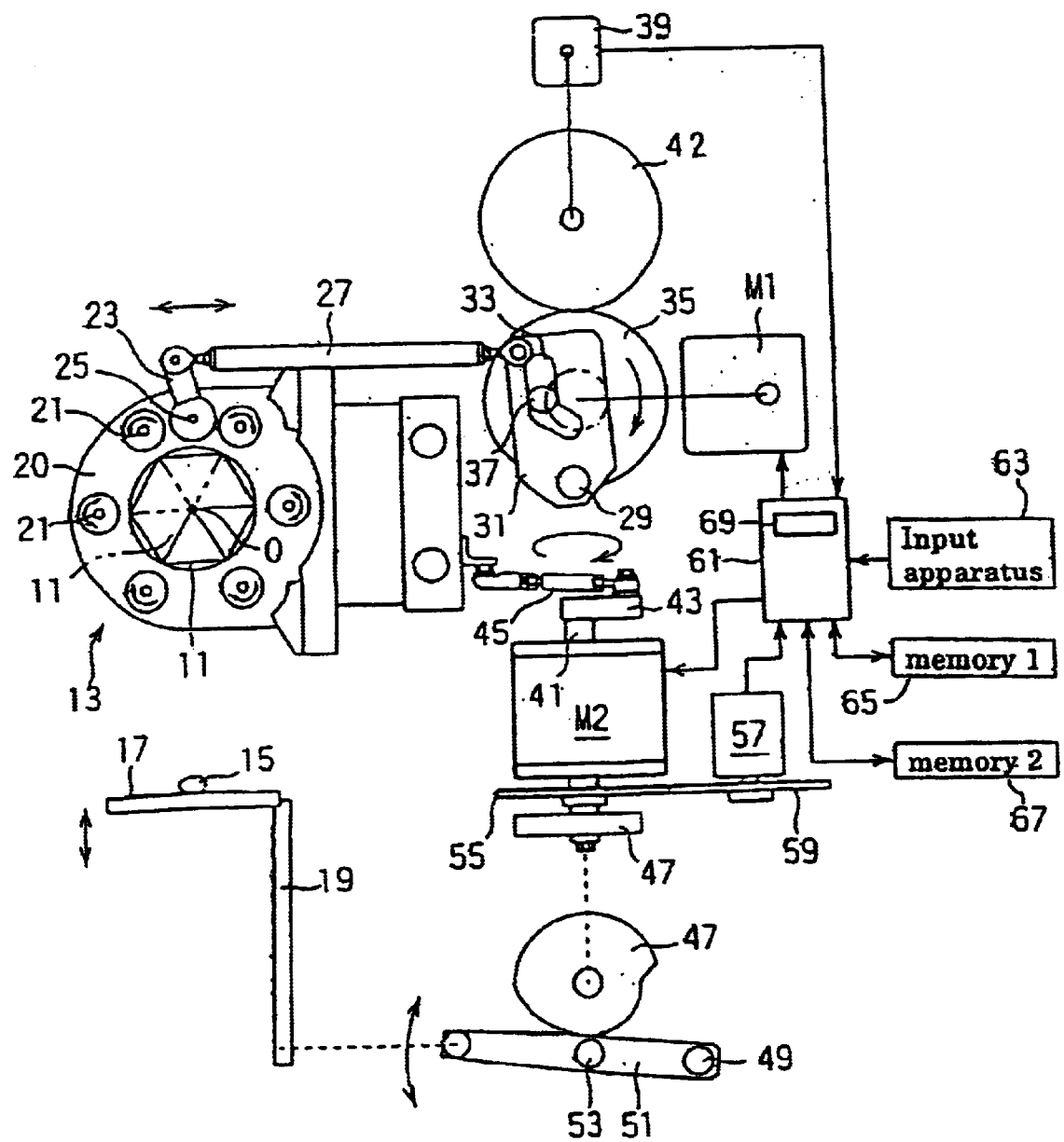
FIG. 2 shows the essential parts of the concept and aspects and functions in general of the apparatus for encrusting a filling material.

Below the combining nozzle 9 a cutting apparatus 13 is located. It can be moved upward and downward. It includes a shutter apparatus that is comprised of a plurality of shutter members 11 (FIG. 2). They are used to cut the bar-like food material that is supplied by the combining nozzle 9, so as to keep the filling material encrusted. Below the cutting apparatus 13 a conveyor 17 is located to receive cut and encrusted food products 15. The conveyor is an example of a food-receiving member to receive the cut and encrusted food products 15. The conveyor 17 conveys them to a next section. The part of the conveyor that is positioned under the cutting apparatus 13 is supported by an elevating apparatus 19. The elevating apparatus 19 can move up and down, so that that part can also be moved up and down.

The cutting apparatus 13 includes a ring-like casing 20. A plurality of pivots 21 are located along a circle on the casing 20 at regular intervals. They can be conveniently rotated. Each pivot is connected to respective shutter members 11 so that they may be moved together. Thus, when the pivots 21 rotate and reverse, the shutter members 11 are moved apart from each other (to form an opening) and are gathered (to shut the opening), respectively. A structure where shutter members are opened and closed by rotating and reversing pivots is known. Thus, no details on the structure will be given.

As a mechanism to open and close the shutter members 11, an opening and closing shaft 25 is located on the casing 20. The shaft 25 can be conveniently rotated. An opening and closing lever 23 is integrally connected to it. The shaft 25 and the pivots 21 are connected through gears, for example, or through the shutters 11, which interlock. Thus, the opening and closing shaft 25 and the pivots 21 are also interlocked. This mechanism allows the shutter members to interlock to be opened and closed. Any known mechanisms may be used for that mechnism. Thus, no more details on it will be given.

When the opening and closing lever 23 is reciprocated, the shutter members 11 are opened and closed. To achieve this operation, one end of a connecting rod 27 is pivoted on the end of the opening and closing lever 23. The other end of the connecting rod 27 is pivoted on the end of a swing member 31. The swing member 31 serves as a part of a cam mechanism, and can be swung around a pin 29. On the swing member 31 a cam groove 33 that is shaped like an L, for example, is formed. A cam follower 37 is located on the eccentric center of a rotation gear 35, which only rotates in one direction. The cam follower 37 engages the cam groove 33 so that the cam follower can conveniently move in the groove 33.

A first control motor M1, such as a servomotor, is located to control the rotation of the rotation gear 35. When the shaft of the motor M1 rotates one revolution, the rotation gear 35, which is a part of the cam, also rotates one revolution in one direction. To sense the rotational position on the shaft of the first control motor M1, a gear 42, which has a diameter the same as that of the gear 35, meshes with the gear 35. The gear 42 is used as a pulse encoder 39. It is an example of a rotational position sensor.

Thus, when the first motor M1 rotates in one direction, simultaneously the gear 35 rotates so that the cam follower 37, which is fixed on it, rotates. Accordingly, the swing member 31 swings around the pin 29. Accordingly, the opening and closing lever 23 is swung by the connecting rod 27. The rod 27 is connected to the swing member 31. As a result, the shutter members 11 are opened and closed. When the control motor M1 rotates one revolution, the rotation gear 35 also rotates one revolution, so that the swing member 31 and the opening and closing lever 23 reciprocates one time. Thus, the shutter members 11 carry out one set of the opening and closing operations.

As stated above, the pulse encoder senses the rotational position on the shaft of the first control motor M1 as it rotates one time. The pulse encoder 39 generates pulses according to the values of the angles of the rotation of the shaft, and generates a reference pulse each revolution of the shaft. Thus, the rotational position on the shaft of the first control motor M1 can be determined by counting the number of pulses that are generated after the reference pulse is generated.

The point of reference for the first control motor M1 is set in line with the conditions existing when the ends of the shutter members 11 meet at the center position O of the cutting apparatus 13. In detail, each shutter member is formed to have a part that projects toward the center position O at the mid-point of its thickest part. It is also formed to have a lower end that can meet the lower ends of the other shutter members at the center position O. When the lower ends of the shutter members meet at the center position O, the bottom surfaces of the shutter members become flat. Under this condition the rotational position on the shaft of the first control motor M1 is set as a reference position.

The reference position for the first control motor M1 is not limited to that position. The reference position may be set on the rotational position on the shaft of the first motor M1 when the upper ends of the shutter members meet at the center position O. Usually, when the lower ends of the shutter members meet at the center position O, simultaneously the upper ends meet at that position. Alternately, a reference position may be set on a position on the shaft that is rotated over 180° from the reference position when the shutter members 11 are opened.

That is, the reference position on the shaft of the first control motor M1 may be determined when the shutter members are opened (as in FIG. 2, when the connecting rod 27 is moved to the right end), or when the phase of the opening of the shutter members is shifted 180° from that position (i.e., when the shutter members 11 are closed). Thus, so as to easily control the opening and closing operations of the shutter members 11, the reference position for the first control motor M1 is set according to the reference position where the shutter members 11 are moved to certain positions.

As stated above, the reference position for the first control motor M1 is set to a position where the shutter members are moved to certain positions, so as to easily control the opening and closing operations of the shutter members of the cutting apparatus 13. Thus, the pulse encoder 39 allows the rotational positions on the shaft of the first control motor M1 to be determined from the reference position. Also, the pulse encoder 39 allows the opening and closing positions and the opening and closing conditions to be determined from the relationship between the cam groove 33 and the cam follower 37, etc. Thus, the opening and closing conditions, the opening and closing speeds, etc. can be advantageously controlled by controlling the first control motor M1.

A second control motor M2 is located so that both the cutting apparatus 13 and the elevating apparatus 19 may be moved up and down. FIG. 2 shows a schematic, simplified, and functional view to merely show the concept and the functions of the apparatuses. A crank arm 43 is connected to a shaft 41 of the second control motor M2, so that when the shaft rotates one revolution the crank arm 43 is rotated one revolution accordingly. One end of a connecting rod 45 is connected to the crank arm 43. The other end is connected to a position on the cutting apparatus 13.

Thus, the cutting apparatus 13 is moved up and down by the crank arm 43 and the connecting rod 45, as the shaft 41 of the second control motor M2 rotates. Thus, when the shaft 41 of the second control motor M2 rotates one revolution, the cutting apparatus 13 will be moved up and down every cycle.

A cam 47 is fixed to the other end of the shaft 41 of the second control motor M2 so as to move the elevating apparatus 19 up and down. A cam follower 53, which is located on a swing lever 51, always contacts the surface of the cam 47. The swing lever 51 is swung up and down around a pivot 49 located at its end. The front end of the swing lever 51 is connected to a position on the elevating apparatus 19.

Thus, the shaft 41 of the second control motor M2 rotates to rotate the cam 47. Then, the elevating apparatus 19 is moved up and down by the swing lever 51. Thus, when the shaft 41 of the second control motor M2 rotates one revolution, the elevating apparatus 19 will be moved up and down every cycle.

It will be understood that the cutting apparatus 13 and the elevating apparatus 19 will be synchronously moved up and down by means of the common second control motor M2. The crank arm 43 moves the cutting apparatus 13 up and down, so that the cutting apparatus 13 will be moved along a sine curve as the second control motor M2 rotates at a constant speed. The elevating apparatus 19 will be moved up and down according to the shape of the cam 47. It should be noted that when the cutting apparatus 13 is moved to the highest position, the elevating apparatus 19 is moved to the highest position. Also, when the cutting apparatus 13 is moved to the lowest position, the elevating apparatus 19 is also moved to the lowest position.

To sense the rotational position on the shaft of the second control motor M2, a gear 55 is located on the shaft 41. A pulse encoder 57 is used as an example of a rotational position sensor. The pulse encoder 57 is provided with a gear 59 that has a diameter that is the same as that of the gear 55. The gear 59 meshes with the gear 55. The pulse encoder 57 is similar to the pulse encoder 39. That is, the position where the reference pulse is generated for the pulse encoder 57 is the reference position for the second control motor M2. That reference position is set to the position where the cutting apparatus 13 and the elevating apparatus 19 are raised to their highest positions. Alternatively, the reference position may be set at the position where the cutting apparatus 13 and the elevating apparatus 19 descend to their lowermost positions. Thus, this position will be shifted from that position by 180°.

Because the reference position for the second control motor M2 is set to correspond to the position where the cutting apparatus 13 is moved uppermost or lowermost, the positions of the cutting apparatus 13 during its movement can be determined by detecting the rotational positions of the shaft of the second control motor M2. Thus, the positions and the moving speeds of the cutting apparatus 13 can be controlled by controlling the second control motor M2.

A motor controller 61 is located to control the rotations of the first and second control motors M1 and M2. An input apparatus 63 is connected to the motor controller 61 to input control data, so as to control the rotations of the first and second control motors M1 and M2. The motor controller 61 includes first and second memories 65 and 67 so as to store patterns for controlling the first and second control motors M1 and M2. Also, the motor controller 61 includes a rotation control section 69 so as to synchronously rotate the first and second control motors M1 and M2, or so as to separately control the rotations of them.

Under the control of the rotation control section 69, which is included in the motor controller 61, for example, if the second control motor M2 rotates at a constant speed in one direction, as in FIG. 3(B) the cutting apparatus 13 will be moved up and down along the sine curve. Also, as in FIG. 3(C), the elevating apparatus 19 will be moved up and down, synchronously with the up and down movements of the cutting apparatus 13, and according to the pattern determined by the shape of the cam 47.

If the first control motor M1 rotates at a constant speed in one direction, as in FIG. 3(A)(a) each shutter member is opened and closed according to the pattern determined by the shape of the cam groove 33. In the pattern the part denoted by "Q" shows a period where the shutter member is kept closed. The "R" shows a condition where the shutter members are closed and moved over. The "Q" and "R" periods are determined by the shape of the cam groove 33.

The "Q" part of the pattern may be formed by temporarily stopping the rotation of the first control motor M1.

The curves as in FIGS. 3(A)(b) and (c) describe when the first control motor M1 is shifted in phase relative to the second control motor M2 by the input from the input apparatus 63. FIG. 4 shows curves that are described when the second control motor M2 is shifted relative to the first control motor M1.

The first and second control motors M1 and M2 can be synchronously or separately controlled by means of the rotation control section 69. Also, the speeds of the rotation of the respective motors at desired angles of rotation can be controlled. FIG. 4(A) shows the area A of the angles during one revolution of the rotation shaft of the first control motor M1, from when the shutter members 11 are opened to when they are closed. FIG. 4(A) also shows the area B of the angles where the shutter members 11 are kept closed. FIG. 4(A) also shows the area C of the angles during the period of time from when the shutter members 11 are closed to when they are opened. Also, FIG. 4(A) shows the area D of the angles during the period the shutter members 11 are kept open. Thus, as in FIG. 4(A), during the periods of the areas A, B, C, and D, the speeds of the rotation of the shaft of the first control motor M1 can be controlled.

The patterns of the areas A, B, C, and D are predetermined by the shape of the cam groove 33 of the cam mechanism. Certain patterns for these areas are used when the first control motor M1 is rotated at a certain constant speed. If the production rate of a bar-like food material is changed, the rotations of the first and second control motors M1 and M2 are synchronously decreased, when, as in FIGS. 3(B) and 3(C), the cutter apparatus 13 and the conveyor are moved up and down and, as in FIG. 3(A), the shutter members 11 are opened and closed along the curve (a), (b), or (c), or when, as in FIG. 4(A), the shutter members are opened or closed and, as in FIGS. 4(B) and 4(C), the conveyor is moved up and down along the curve (a), (b), or (c). Thus, the cutting operation for the bar-like food material is advantageously carried out.

In that case, as the rotation of the first control motor M1 changes, the opening and closing speeds of the shutter members 11 are changed. These opening and closing speeds can vary within a permissible range where the varying does not affect the food material 15, but can change the rate of the production of the food material.

In the conventional apparatus explained above, to change the rate of the production of food materials, when the cutting apparatus and the food-receiving member are moved up and down, simultaneously the direction and angles of the rotation and the starting and ending timings of the rotation to start and terminate the reciprocating movement had to be set and changed. Thus, those settings and changings were inconvenient.

In general, to widely change the rate of the production of a food material the variance of the closing speed of the shutter members tends to be too large to advantageously cut an encrusted food material.

It was difficult for the conventional apparatus to respond to such a variation of the rate of the production. According to this invention, for example, when the speed of the closing operation of the shutter members 11 is controlled to be fast or slow by controlling the speed of the rotation of the shaft of the first control motor M1 at the area A of the angles, so as to cut a bar-like food material that is extruded at a constant speed, the speeds of the rotation of the shaft at any of the areas B, C, and D can be adjusted. By this adjustment, the time of one revolution of the shaft of the first control motor M1 can be kept constant, so that some kinds of cutting operations of the bar-like food material can be done. In this case, a cam mechanism is used to close the shutter members 11, so that the patterns of the operation of the shutter members are always the same. Also, the first control motor M1 can be easily controlled.

Similar operations can be performed for the second control motor M2. For example, the speed of the cutting apparatus 13 when it descends can be controlled in response to the closing operation of the shutter members 11. Also, the cutting apparatus 13 can be rapidly elevated. Thus, under a condition where the time of one revolution of the second control motor M2 is kept constant, the cutting apparatus 13 and the conveyor 17 can be moved up and down by the elevating member 19.

Because the reference positions are set for the first and second control motors M1 and M2, it can be predetermined what ranges of the angles of the rotations of the shafts of the first and second control motors M1 and M2 correspond to the areas A, B, C, and D. Thus, the speeds of the angles of the shafts can be easily set and changed in the areas A, B, C, and D.

If, for example, the speeds of the rotations of the first and second control motors M1 and M2 increase so as to raise the rate of the production of a food material, the time of the closing operation in the area A of the angles could be shortened, so that a bar-like food material could not be advantageously cut. In that case, if the time of the closing operation in the area A of the angles is kept as usual at a certain time, while if the times in the areas C and D are shortened (i.e., the shaft being rotated fast), a good cutting operation of the bar-like food material can be achieved under the usual conditions. Also, the rate of the production of the food material can be increased. The area of the angles for the second control motor M2 corresponding to the area A for the first control motor M1 is set in line with a pattern determined under the usual conditions. Also, in the areas corresponding to the areas C and D for the first control motor M1, the number of revolutions of the shaft of the second control motor M2 is set to be high.

The first and second control motors M1 and M2 rotate in certain directions. Thus, even if in each area the rotations of those motors are changed, these changes are not done suddenly, but can be done smoothly.

A pattern of the movement of each of the shutter members and the conveyor is determined by changing the speed of the angles of the rotation of each shaft so as to cut a bar-like food material. These patterns are stored in the memories 65, 67, which function as a storage device. Thus, the first and second control motors M1 and M2 can be immediately controlled by using the patterns when the bar-like food material is cut under the same conditions. Also, the same patterns of movements can be repeated.

Thus, to repeatedly cut a bar-like food material under the same requirements, the pattern that is pre-stored in the memories 65, 67 can be used to control the first and second control motors M1 and M2. Thus, these motors can be easily controlled.

As stated above, the patterns of the up and down movements and the closing and opening movements, of the shutter members, of the cutting apparatus are determined by the cam mechanism. The reference positions of the first and second motors are set to correspond to certain points on the patterns to control the rotation of the cam. Rotational positions of the first and second control motors correspond to positions within the areas of the angles of the patterns. Thus, the speed of the angles on the patterns of the movements can be easily controlled.

Thus, if to change the rate of the productivity of a food material the speeds of the rotations of the first and second control motors are synchronously changed, or if the speed of the rotation within specific angles of rotation is changed, the condition can be readily set to advantageously cut a bar-like food material. Thus, the disadvantages of the conventional apparatuses can be overcome.

What is claimed is:

1. An apparatus for encrusting a filling material comprising an upwardly and downwardly movable cutting apparatus for opening and closing shutter members to cut a bar-like food material to form an encrusted food product, an upwardly and downwardly movable food-receiving apparatus for receiving the encrusted food product, the shutter members being opened and closed based on a shutter movement pattern, the cutting apparatus being movable up and down based on a cutting apparatus movement pattern, and the food-receiving apparatus being movable up and down based on a food-receiving pattern of movement, and means for synchronizing the cutting apparatus, the shutter members, and the food-receiving apparatus in each of operating areas (A) for closing the shutter members, (B) for keeping the shutter members closed, (C) for opening the shutter members, and (D) for keeping the shutter members open.

2. An apparatus according to claim 1, wherein the shutter movement pattern or the food-receiving pattern of movement is formed by a cam.

3. An apparatus according to claim 1, wherein the shutter movement pattern or the food-receiving pattern of movement is programmed in a memory device.

4. An apparatus according to any one of claims 1–3, wherein the shutter movement pattern can be shifted relative to the other patterns.

5. An apparatus according to claim 4, including a rotary driving means for opening and closing the shutter members and wherein the rotating speed of the rotary driving means can be changed in one or more of the operating areas.

6. An apparatus according to claim 5, wherein, in proportion to the rotating speed in the operating area for closing the shutter members, the rotating speeds in the other operating areas are adjusted so as not to change predetermined time in a cycle.

7. An apparatus according to claim 5, wherein the rotating speeds both in the operating area for opening the shutter members and in the operating area for keeping the shutter members open are adjusted to be faster than the rotating speed in the operating area for closing the shutter members.

8. An apparatus according to claim 4, including a first control motor for carrying out the operations for opening and closing the shutter members and a second control motor for carrying out the operations for moving up and down the cutting apparatus and the food-receiving apparatus.

* * * * *